United States Patent
Inoue (10) Patent No.: US 11,011,074 B2
(45) Date of Patent: May 18, 2021

(54) INFORMATION PROCESSING SYSTEM, INFORMATION PROCESSOR, INFORMATION PROCESSING METHOD AND PROGRAM

(71) Applicant: NS SOLUTIONS CORPORATION, Tokyo (JP)

(72) Inventor: Kazuyoshi Inoue, Tokyo (JP)

(73) Assignee: NS SOLUTIONS CORPORATION, Tokyo (JP)

(*) Notice: Subject to any disclaimer, the term of this patent is extended or adjusted under 35 U.S.C. 154(b) by 241 days.

(21) Appl. No.: 16/074,619

(22) PCT Filed: Feb. 22, 2017

(86) PCT No.: PCT/JP2017/006543
§ 371 (c)(1),
(2) Date: Aug. 1, 2018

(87) PCT Pub. No.: WO2017/150293
PCT Pub. Date: Sep. 8, 2017

(65) Prior Publication Data
US 2019/0043385 A1 Feb. 7, 2019

(30) Foreign Application Priority Data
Mar. 4, 2016 (JP) .............................. JP2016-042252

(51) Int. Cl.
*G09B 19/24* (2006.01)
*G05B 19/418* (2006.01)
(Continued)

(52) U.S. Cl.
CPC ......... *G09B 19/24* (2013.01); *G02B 27/0172* (2013.01); *G05B 19/418* (2013.01);
(Continued)

(58) Field of Classification Search
CPC ........ G09B 19/24; G09B 5/02; G09B 19/003; G09B 19/0069; G02B 27/0172;
(Continued)

(56) References Cited

U.S. PATENT DOCUMENTS 10,134,303 B2* 11/2018 Peters ..................... G09B 5/00
2013/0189658 A1* 7/2013 Peters ..................... G09B 5/06
434/234
(Continued)

FOREIGN PATENT DOCUMENTS

JP 9-68444 A 3/1997
JP 2003-196681 A 7/2003
(Continued)

OTHER PUBLICATIONS

Kobayashi et al., Traing System of Manual Arc Welding by Means of Mixed Reality Techniques Face-Shield-Like HMD and Virtual Electrode, Translations of the Virtual Reality Society of Japan, vol. 7, No. 2, pp. 211-218, Jun. 30, 2002.
(Continued)

*Primary Examiner* — Malina D. Blaise
(74) *Attorney, Agent, or Firm* — Arent Fox LLP (57) ABSTRACT

The problem is solved by an information processing system including: a standard data acquirer that acquires registered standard data on work; a work data acquirer that acquires work data on a worker performing the work; a determiner that determines whether or not a difference between the standard data acquired by the standard data acquirer and the work data acquired by the work data acquirer is a threshold value or more; a generator that generates an instruction image regarding correction of the work according to the difference when the difference is determined to be the threshold value or more by the determiner; and a displayer that displays the instruction image generated by the generator on a display unit of a display device worn by the worker to display the instruction image superimposed on a real space.

8 Claims, 6 Drawing Sheets

(51) Int. Cl.
*G09B 19/00* (2006.01)
*G02B 27/01* (2006.01)
*G09B 5/02* (2006.01)

(52) U.S. Cl.
CPC ............ *G09B 5/02* (2013.01); *G09B 19/003* (2013.01); *G09B 19/0069* (2013.01); *G02B 2027/014* (2013.01); *G02B 2027/0138* (2013.01); *Y02P 90/02* (2015.11)

(58) Field of Classification Search
CPC ...... G02B 2027/0138; G02B 2027/014; G05B 19/418; Y02P 90/02
See application file for complete search history.

(56) References Cited

U.S. PATENT DOCUMENTS

| | | | |
|---|---|---|---|
| 2014/0018712 A1* | 1/2014 | Bouchet | A61H 23/02 601/56 |
| 2014/0028712 A1* | 1/2014 | Keating | G06T 7/246 345/633 |
| 2014/0351191 A1* | 11/2014 | Kon | G06N 5/04 706/45 |
| 2015/0049004 A1* | 2/2015 | Deering | G02B 27/0093 345/8 |
| 2015/0109338 A1* | 4/2015 | McKinnon | G06F 16/50 345/633 |
| 2015/0310667 A1* | 10/2015 | Young | G09G 5/003 345/633 |
| 2016/0260261 A1* | 9/2016 | Hsu | B23K 9/32 |
| 2016/0269631 A1* | 9/2016 | Jiang | G09B 5/02 |
| 2016/0358383 A1* | 12/2016 | Gauglitz | G06T 19/006 |
| 2017/0252108 A1* | 9/2017 | Rios | G16H 40/63 |

FOREIGN PATENT DOCUMENTS

| | | |
|---|---|---|
| JP | 2005-242418 A | 9/2005 |
| JP | 2014-228725 A | 12/2014 |

OTHER PUBLICATIONS

Nikkei Information Strategy wearable, No. 277, pp. 28-33, Mar. 29, 2015.

* cited by examiner

FIG.4

| WORK ID | STANDARD DATA |
|---------|---------------|
| A01 | A01001 |
| A02 | A02001 |
| . | . |
| . | . |
| . | . |

INFORMATION PROCESSING SYSTEM, INFORMATION PROCESSOR, INFORMATION PROCESSING METHOD AND PROGRAM

CROSS-REFERENCE TO RELATED APPLICATIONS

This application is a National Stage entry of International Application PCT/JP2017/006543, filed on Feb. 22, 2017, which claims priority to Japanese Patent Application No. 2016-042252, filed on Mar. 4, 2016. The disclosures of the priority applications are incorporated in their entirety herein by reference.

TECHNICAL FIELD

The present invention relates to an information processing system, an information processor, an information processing method, and a program, for displaying in a superimposed manner an instruction image regarding work at a workplace.

BACKGROUND ART

Patent Literature 1 discloses a technique of evaluating work performed by a worker on the basis standard work information and the state of a workpiece.

CITATION LIST

Patent Literature

Patent Literature 1: Japanese Laid-open Patent Publication No. 2005-242418

SUMMARY OF INVENTION

Technical Problem

However, the technique described in Patent Literature 1 has a problem of incapability of informing the worker that the worker is performing a motion different from that in the standard data to instruct correction of the work.

Further, because of retirement of so-called baby-boomers, there is a problem in clearly and correctly handing the skill of skilled workers down to many junior workers. Further, with globalization, there is a problem in making overseas workers perform the work, which has been performed in Japan, without deteriorating quality of the work.

Solution to Problem

An object of the present invention is to speedily inform a worker of an instruction to correct work and appropriately inform a junior worker of a skill of a skilled worker.

Solution to Problem

Hence, an information processing system of the present invention includes: a standard data acquirer that acquires registered standard data on work; a work data acquirer that acquires work data on a worker performing the work; a determiner that determines whether or not a difference between the standard data acquired by the standard data acquirer and the work data acquired by the work data acquirer is a threshold value or more; a generator that generates an instruction image regarding correction of the work according to the difference when the difference is determined to be the threshold value or more by the determiner; and a displayer that displays the instruction image generated by the generator on a display unit of a display device worn by the worker to display the instruction image superimposed on a real space.

Advantageous Effects of Invention

According to the present invention, it is possible to speedily inform a worker of an instruction to correct work and appropriately inform a junior worker of a skill of a skilled worker.

DESCRIPTION OF EMBODIMENTS

Hereinafter, an embodiment of the present invention will be described based on the drawings.

Figure 1:
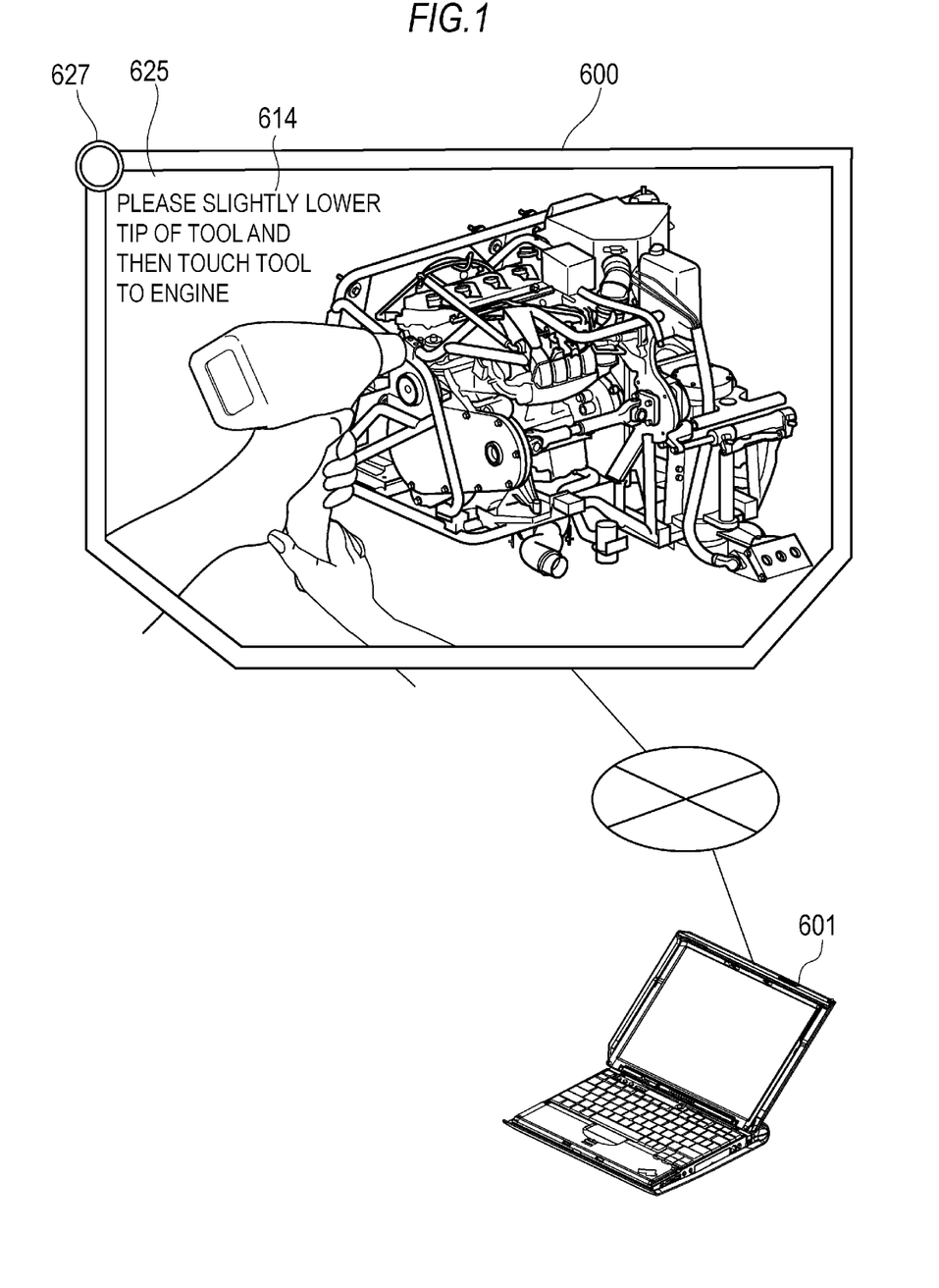
FIG. 1 is a view illustrating one example of a system configuration of an information processing system.

FIG. 1 is a view illustrating one example of a system configuration of an information processing system. As illustrated in FIG. 1, the information processing system includes, as the system configuration, a display device 600 and an information processor 601. The display device 600 and the information processor 601 are connected communicably over a network or the like. Although only the display device 600 is connected communicably with the information processor 601 in the example of FIG. 1, a plurality of display devices may be connected communicably with the information processor 601. The information processor 601 is one example of a computer.

The display device 600 is a glasses-type display device worn by a worker. In this embodiment, the worker who is performing work of assembling an engine of an automobile, work of assembling a vehicle body or the like performs the work while wearing the display device 600.

The display device 600 is an optical see-through display device and has an optical see-through display unit 625 provided at a position corresponding to lens portions of a pair of glasses. The worker wearing the display device 600 can see, through the display unit 625 of the display device 600, an article existing ahead of a line of sight in a real space. Further, an image generated by the information processor 601 is displayed on the display unit 625, so that the worker wearing the display device 600 can recognize a state where the image generated by the information processor 601 is superimposed on the real space which the worker is watching through the display unit 625, namely, an augmented reality space (AR space).

The display device 600 further has an image-capturing unit 627 provided at a position adjacent to the display unit 625. The image-capturing unit 627 is installed so that a direction of the line of sight of the wearer of the display device 600 and an image-capturing direction of the image-capturing unit 627 have a mutually matched relation. This enables the image-capturing unit 627 to capture an image of the work in the real space which the worker wearing the display device 600 is watching. As another example, the image-capturing unit 627 may be set so that the image-capturing direction and the direction of the line of sight of the wearer of the display device 600 have a certain relation. However, the image-capturing unit 627 is not an essential component of the display device 600.

The information processor 601 acquires, for example, measured data regarding work by a veteran worker wearing a plurality of motion sensors from the plurality of motion sensors, generates data on a 3D model from the measured data, and registers the data on the 3D model as standard data on the work. Besides, the information processor 601 may acquire, for example, measured data regarding work by a worker wearing a plurality of motion sensors from the plurality of motion sensors, generate data on a 3D model from the measured data, and thereby acquire the data on the 3D model as work data.

However, the above does not limit this embodiment. The information processor 601 may generate data on a 3D model from measured data regarding work by a veteran worker by a motion capture, and register the data on the 3D model as standard data. Besides, the information processor 601 may generate data on a 3D model from measured data regarding work by a worker by a motion capture, and thereby acquire the data on the 3D model as work data.

For example, in the case of an optical motion capture, the information processing system includes a plurality of cameras and so on. The plurality of cameras take pictures of a veteran worker with a plurality of reflective markers put on the body and find three-dimensional coordinates of positions of the reflective markers from reflected light beams by the reflective markers. The information processor 601 may generate a 3D model of the veteran worker from the three-dimensional coordinates of the positions of the plurality of reflective markers, reflect motion data on the veteran worker in the 3D model, and register the motion data as standard data. Similarly, the plurality of cameras take pictures of a work by a worker with a plurality of reflective markers put on the body and find three-dimensional coordinates of positions of the reflective markers from the reflected light beams by the reflective markers. The information processor 601 may generate a 3D model of the worker from the three-dimensional coordinates of the positions of the plurality of reflective markers, reflect motion data on the worker in the 3D model, and thereby acquire the motion data as work data.

The information processor 601 determines whether or not a difference between the standard data and the acquired work data is a threshold value or more and, when the difference is determined to be the threshold value or more, generates an instruction image regarding correction of the work according to the difference, and transmits the instruction image to the display device 600. Upon reception of the instruction image from the information processor 601, the display device 600 displays the instruction image on the display unit 625. In the example of FIG. 1, an instruction image 614 regarding the way to put a tool in the work of assembling the engine of the automobile is displayed on the display unit 625 of the display device 600.

According to the information processing system of this embodiment, it is possible to speedily inform a worker of an instruction to correct work based on the difference from a veteran worker and appropriately inform a junior worker of a skill regarding the work by a skilled worker.

Figure 2:
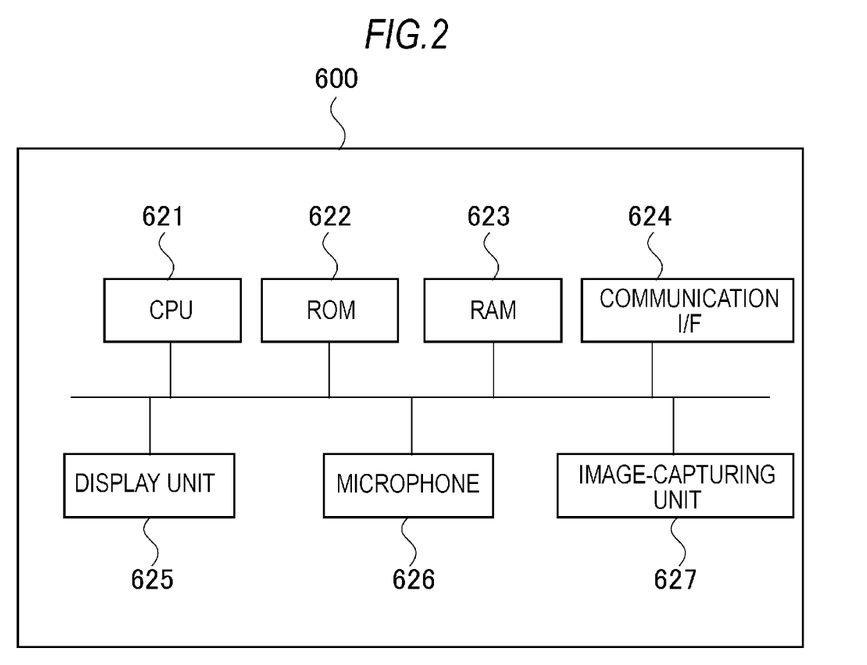
FIG. 2 is a diagram illustrating one example of a hardware configuration of a display device.

FIG. 2 is a diagram illustrating one example of a hardware configuration of the display device 600. The display device 600 includes, as the hardware configuration, a CPU 621, a ROM 622, a RAM 623, a communication I/F 624, the display unit 625, a microphone 626, and the image-capturing unit 627. The CPU 621 reads a program stored in the ROM 622 and executes various kinds of processing. The RAM 623 is used as a temporary storage area such as a main memory, a work area and the like for the CPU 621. The CPU 621 reads the program stored in the ROM 622 and executes the program, whereby the function of the display device 600 and the processing by the display device 600 in the sequence chart are realized.

The communication I/F 624 performs communication processing with the information processor 601 over the network. The display unit 625 displays various kinds of information. The microphone 626 receives input of voice such as a speech or the like of the worker wearing the display device 600. Note that the voice is sent to the CPU 621 and subjected to voice recognition processing in the CPU 621. The CPU 621 can accept various instructions by the user from the result of the voice recognition. The image-capturing unit 627 takes a picture of the real space. The ROM 622 is one example of a storage medium.

Figure 3:
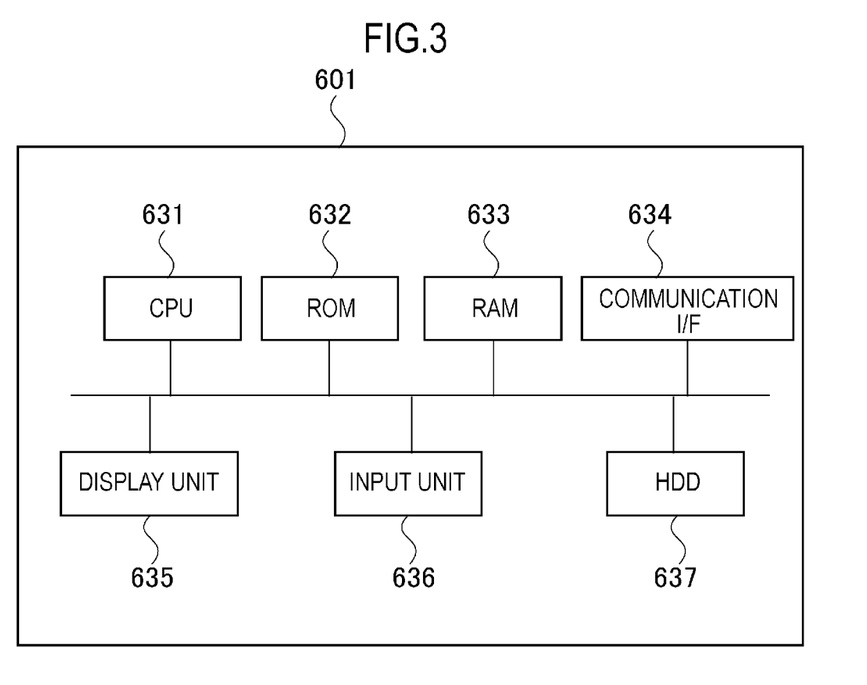
FIG. 3 is a diagram illustrating one example of a hardware configuration of an information processor.

FIG. 3 is a diagram illustrating one example of a hardware configuration of the information processor 601. The information processor 601 includes a CPU 631, a ROM 632, a RAM 633, a communication I/F 634, a display unit 635, an input unit 636, and an HDD 637. The CPU 631, ROM 632, RAM 633, and communication I/F 634 are the same as the CPU 621, ROM 622, RAM 623, and communication I/F 624, respectively. The display unit 635 displays various kinds of information. The input unit 636 includes a keyboard and a mouse, and accepts various operations by the user. The HDD 637 stores data, various programs and so on. The CPU 631 reads a program stored in the ROM 632 or the HDD 637 and executes the program, whereby the function of the information processor 601 and the processing by the information processor 601 in the sequence chart are realized. The ROM 632 or the HDD 637 is one example of a storage medium.

The data that the information processor 601 stores in the HDD 637 and the like will be described using FIG. 4. However, a storage destination where the data is stored is not limited to the HDD 637 but may be a data sever or the like on a network with which the information processor 601 is communicable.

Figure 4:
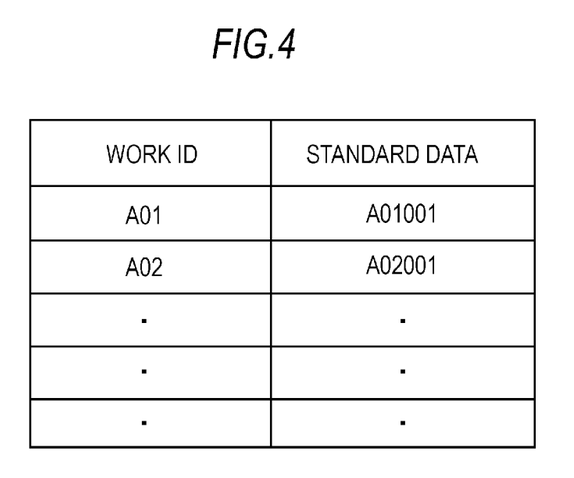
FIG. 4 is a chart illustrating one example of a standard data table.

A standard data table illustrated in FIG. 4 includes a work ID and standard data corresponding to the work ID. The work is, for example, work of assembling an engine of an automobile, work of assembling a vehicle body or the like.

In FIG. 4, in the standard data table, one item of standard data is registered for one work ID. One example of the standard data is, for example, the data on the 3D model generated from the above-described measured data regarding the work by the veteran worker.

Figure 5:
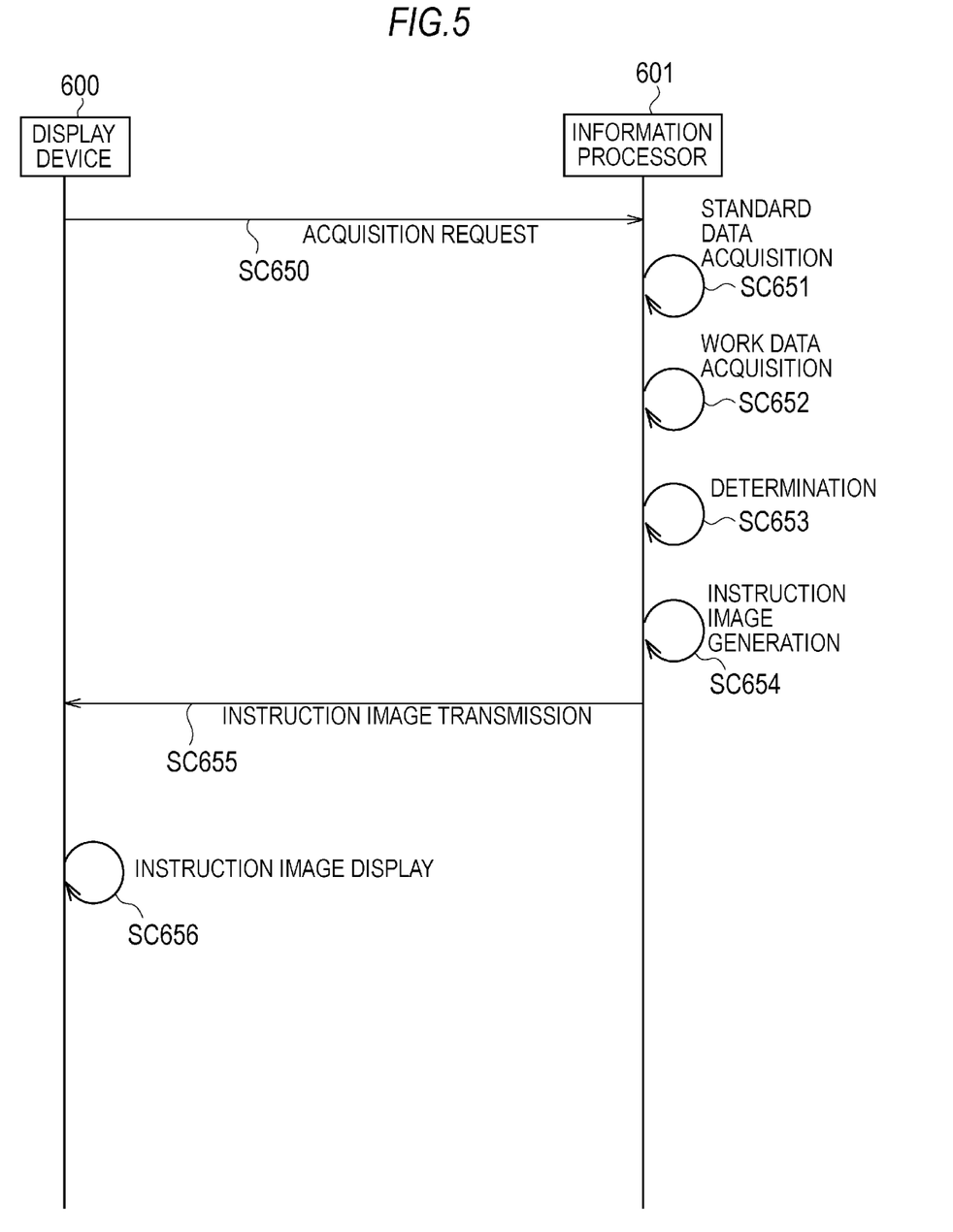
FIG. 5 is a sequence chart illustrating one example of information processing of displaying an instruction image of the information processing system.

FIG. 5 is a sequence chart illustrating one example of information processing of displaying the instruction image of the information processing system.

At SC650, the display device 600 transmits an acquisition request for the instruction image to the information processor 601. The display device 600 may specify work that the worker is going to perform from now via voice input by the worker wearing the display device 600, or may specify work set in a setting file in the case where work is set in the setting file or the like in advance in each display device. The acquisition request for the instruction image includes a work ID for identifying the work specified by the display device 600. The acquisition request at SC650 is transmitted, for example, at the time when starting the work.

At SC651, the information processor 601 acquires standard data corresponding to the work ID from the standard data table on the basis of the work ID included in the acquisition request for the instruction image. SC651 is one example of processing of standard data acquisition.

At SC652, the information processor 601 acquires work data on a worker who is performing the work. The information processor 601 may generate data on a 3D model from measured data regarding the work by the worker acquired from the motion sensors worn by the worker and thereby acquire the data on the 3D model as the work data, or may generate data on a 3D model from measured data regarding the work by the worker by the motion capture and thereby acquire the data on the 3D model as the work data. However, the work data and the standard data are not limited to the data on the 3D model, but description will be made using the 3D model as an example for simplifying the description in the following. Further, description will be made assuming that the measured data on the worker and on the veteran worker is acquired by the motion capture for simplifying the description in the following. SC625 is one example of processing of work data acquisition.

At SC653, the information processor 601 determines whether or not a difference between the acquired standard data and the acquired work data is a threshold value or more. The threshold value is stored, for example, in the HDD 637 or the like. The information processor 601 can set or change the threshold value according to a setting operation by an operator via the input unit 636 or the like.

When the difference is determined to be the threshold value or more, the information processor 601 generates, at SC654, an instruction image regarding correction of the work according to the difference. The information processor 601 generates the instruction image as illustrated in FIG. 1, for example, on the basis of the difference between the acquired standard data and the acquired work data. Besides, the information processor 601 may generate, according to the work, an instruction image for correction on the basis of a difference between portions as a point for comparison in the acquired standard data and the acquired work data. For example, in the case where the work is the work of assembling the engine of the automobile, the information processor 601 compares, at SC653, portions at a point set according to the work such as a bending down degree, an elbow bending degree, a wrist twisting degree or the like of the worker. The information processor 601 determines whether or not the difference between the portions at each point is a threshold value or not and, when the difference is the threshold value or more, generates an instruction image according to the difference at SC654. In the case of the above configuration, the threshold value is stored, for example, in the HDD 637 or the like for each comparison point of the work. The information processor 601 can set or change the threshold value for each comparison point of the work according to a setting operation by an operator via the input unit 636 or the like.

Next, description will be made using the work of assembling the engine of the automobile as an example. It is assumed that a standing position, a posture, a walk flow line of the worker are set as the comparison points of the work of assembling the automobile.

Figure 6:
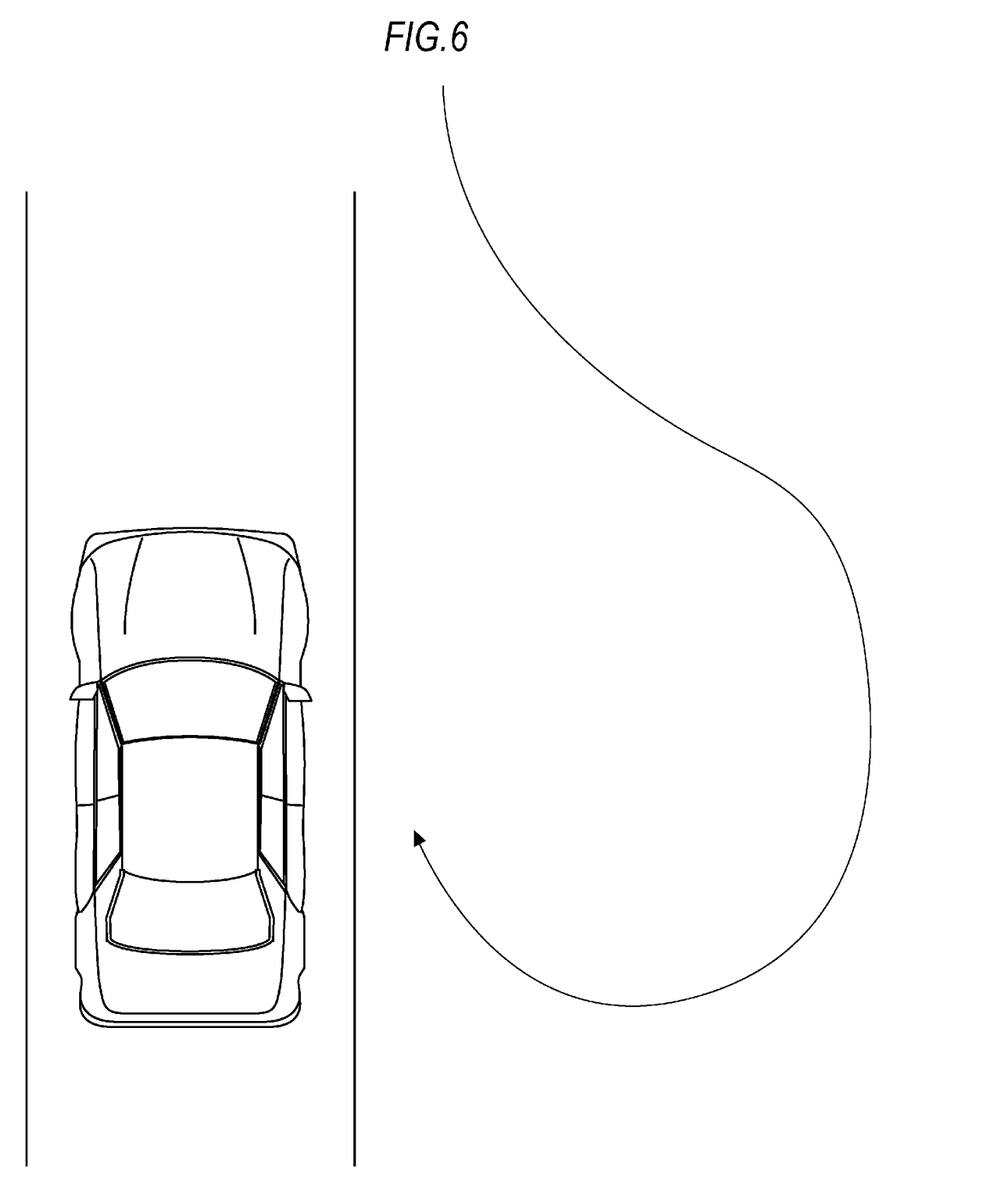
FIG. 6 is a view illustrating one example of a walk flow line in the standard data.

At SC653, since the work is the work of assembling the engine of the automobile, the information processor 601 determines whether or not the differences between the portions of the standing position, the posture, the walk flow line of the worker as points for comparison in the acquired standard data and the acquired work data, are the respective threshold values or more. The information processor 601 determines whether or not the difference between the portions at each point is the threshold value or more and, when the difference is the threshold values or more, generates an instruction image according to the difference at SC654. Here, FIG. 6 is a view illustrating one example of the walk flow line in the standard data. For example, in "seat input" being a step of the work of assembling the automobile, in the case where the standard data relating to the walk flow line as illustrated in FIG. 6 is registered according to the positional relation between a tool used in inputting the seat into the vehicle and the vehicle body, the information processor 601 compares an actual walk flow line of the worker with the walk flow line in the standard data to determine whether or not the difference therebetween is larger than a set threshold value set for the walk flow line. When the difference is larger than the threshold value, the information processor 601 generates, according to the difference, an instruction image such as "Please take one more step backward to the left and then move forward to put the seat into the vehicle!". However, the instruction image is not limited to this, but the information processor 601 may generate, based on the data on the 3D model in the standard data regarding the walk flow line, an instruction image in which the work by the veteran worker is reproduced as an AR (Augmented reality) image via the display unit 625 of the display device 600. The information processor 601 acquires the walk flow line of the worker from the measured data by the motion capture in this embodiment, but is not limited to this. The information processor 601 may acquire the walk flow line of the worker from a history of wireless communication with a wireless access point with the display device 600 held by the worker of a plurality of wireless access points provided at the workplace.

At SC655, the information processor 601 transmits the generated instruction image to the display device 600 which is an acquisition request source. The display device 600 receives the instruction image.

At SC656, the display device 600 displays the received instruction image on the display unit 625.

Figure 7:
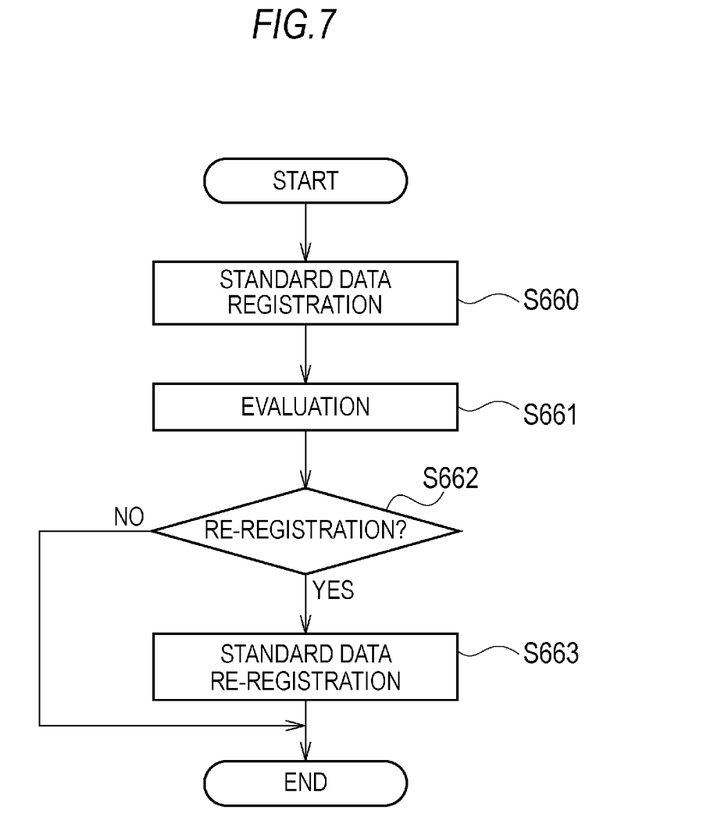
FIG. 7 is a flowchart illustrating one example of information processing relating to re-registration of the standard data.

FIG. 7 is a flowchart illustrating one example of information processing relating to re-registration of the standard data.

At S660, the information processor 601 generates data on a 3D model from the measured data regarding the work by the skilled worker by the motion capture, and registers the data on the 3D model as the standard data in the HDD 637 or the like.

At S661, the information processor 601 evaluates whether or not the data registered at S660 is appropriate as the standard data. For example, the information processor 601 evaluates the registered data to be not appropriate as the standard data when the percentage of workers determined to have a difference between the work data and the standard data of the threshold value or more at SC653 in FIG. 5 among a plurality of workers performing the work is a set value or more, whereas evaluates the registered data to be appropriate as the standard data when the percentage is less than the set value. The set value is stored, for example, in the HDD 637 or the like. The information processor 601 can make a change or the like to the set value according to the setting operation or the like by the operator via the input unit 636 or the like.

At S662, the information processor 601 determines whether or not to re-register the standard data on the basis of the evaluation at S661. When the data is evaluated to be appropriate as the standard data at S661, the information processor 601 determines that the re-registration is not necessary, and ends the processing in the flowchart illustrated in FIG. 7. On the other hand, when the data is evaluated to be not appropriate as the standard data at S661, the information processor 601 determines that the re-registration is necessary, and proceeds to S663.

At S663, the information processor 601 generates again data on a 3D model from the measured data regarding the work by the skilled worker by the motion capture or the like, and re-registers the data on the 3D model as the standard data in the HDD 637 or the like. In this case, a skilled worker different from the skilled worker from whom the measured data is acquired at S660 may be caused to perform the work, and the information processor 601 may generate data on a 3D model from measured data, and re-register the data on the 3D model as the standard data in the HDD 637 or the like.

Execution of the information processing as illustrated in FIG. 7 makes it possible to evaluate the registered standard data and to re-register standard data when the registered standard data is not appropriate. With globalization, there is a case of desiring to make overseas employees perform the work which has been performed in Japan. However, due to the difference in habit, build or the like, for example, the standard data registered based on the work by domestic skilled workers is not necessarily appropriate data for the overseas employees. Even in such a case, the information processor 601 executes the information processing as illustrated in FIG. 7 to register standard data suitable for a factory in a country or improve the standard data, thereby making it possible to appropriately inform junior workers of the quality of a product and the like and the skill of the skilled workers.

Incidentally, the configuration in which the motion is analyzed by using the 3D model regarding the work requiring a comparatively complicated motion has been described in the above-described example. However, the configuration is not limited to the above-described example but is applicable also to simpler work. In simple work, it seems that there is not so large difference in motion between the skilled worker and a beginning worker at first glance. However, rather in work that seems simple, a clear difference appears between the skilled worker knowing well the point of the motion during the work and the inexperienced beginning worker, not only in work efficiency but also in injury, accumulation degree of fatigue and so on.

This results from the fact that the inexperienced worker has not acquired yet the rhythm of work, the degrees of applying and releasing force, the instinct and knack which the skilled worker has acquired through long experience. According to the processing in the above-described embodiment, the instinct and knack of the skilled worker appear in a visible form based on the data digitized by a wearable sensor, thereby making it possible to objectively inform the inexperienced worker of the instinct and knack which can be actually acquired after long periods of time. Therefore, according to the processing in the above-described embodiment, even the inexperienced worker becomes possible to perform the work similarly to the skilled worker in a short time.

Here, a step of attaching a drawer door of refrigerator assembling work will be described as an example of the simple work. A refrigerator before attachment of a drawer door is conveyed by an intermittent-conveying type belt conveyor to the front of a worker and drawer doors are piled up behind the worker, and the step of attaching the drawer door relating to this embodiment is composed of two steps of work such as (1) the worker turning around toward the back and picking up the drawer door and (2) then pushing the drawer door into a predetermined space of the refrigerator for attachment.

In the above (1), a turn-around angle is a point. A too-large turn-around angle causes a large burden on the waist or back, thus possibly raising the impossibility of continuing the work for a long time or leading to injury. On the other hand, a too-small turn-around angle results in the impossibility of tightly gripping the drawer, thus causing turning around toward the back again or falling in the middle the drawer that has been gripped in a halfway manner. Therefore, an appropriate turn-around angle is required.

Hence, first, for example, a wireless motion recorder (a three-axis acceleration sensor and a three-axis angular velocity sensor) is attached to a predetermined position on the body of a skilled worker, and a rotation angle of each portion at the time of a turn-around motion in the case where the skilled worker performs the (1) work is measured in advance as the standard data on the turn-around angle. Note that it is also possible to capture an image of the motion of the work by a camera so as to measure the turn-around angle by image analysis. Besides, since workers vary in body type (body height and body weight), the turn-around angles of a plurality of skilled workers different in body type may be prepared as the standard data in advance.

Further, the turn-around angle in the case where the inexperienced beginning worker performs the (1) work is similarly measured. Then, the information processor 601 compares the turn-around angle of the beginning worker with the turn-around angle being the standard data. In this event, such a configuration may be employed that the turn-around angle of a skilled worker having a body type closest to the body type of the beginning worker is selected as the standard data to be compared.

The information processor 601 further generates an instruction image regarding correction of the work by the beginning worker according to the turn-around angle and displays the instruction image on the display device 600. For example, in the case where the turn-around angle is insufficient, an arrow changed in size, thickness, or color according to an excess or deficiency amount of the turn-around angle may be indicated toward a turn-around direction (or an opposite direction). Alternatively, messages such as "Let's turn around little more!", "Turning around is too much!" may be prepared in advance for each of the excess and deficiency amounts, and data on a message image may be read (an instruction image may be generated) and displayed.

Note that the information processor 601 may be configured to monitor the turn-around angle at all times, determine, when detecting the motion of the worker exceeding a predetermined angle or more and the motion to return the initial angle, that the worker is performing the (1) work, and display an instruction image regarding the above-described comparison with the standard data and correction of the work. Besides, such a configuration may be employed that, for example, in the case of performing simulation of the work, the worker wears a pin microphone in advance, voice such as "Start turning around!", "Turning around OK!" is produced every time of start and end of the work, the voice is sent to the information processor 601, and the information processor 601 determines that the worker is performing the (1) work on the basis of the voice.

Further, in the above (2), the standing position and the posture are important. At the time of performing the work of attaching the drawer door, a form of pushing the drawer horizontally from a position directly in front of an attachment space in the refrigerator is ideal. If the standing position is displaced to right or left or the bending degree of the body is insufficient, the worker, when trying to perform attachment from a diagonal direction, cannot successfully hang the drawer door on a rail in the refrigerator.

Hence, as the standard data on the standing position, the standing position in the case where the skilled worker performs the (2) work is measured in advance. For example, such a configuration may be employed that RFIDs are installed at regular intervals, for example, on a belt conveyor, and a small-sized reader is attached to the skilled worker in advance, and the standing position of the worker is measured based on the strengths of signals of the RFIDs read by the reader. Alternatively, such a configuration may be employed that the measurement is performed based on an image captured by a camera fixed on the ceiling.

Here, as the standard data, an angle of each joint of the body of the skilled worker may be additionally measured. Since workers vary in body type (body height and body weight), angles of joints of a plurality of skilled workers different in body type may be prepared in advance as the standard data.

Further, the standing position and the angle of each joint in the case where the inexperienced beginning worker performs the (2) work are similarly measured. Then, the information processor 601 compares the standing position and the angle of each joint of the beginning worker with the standing position and the angle of each joint being the standard data. In this event, such a configuration may be employed that the standard data of a skilled worker having a body type closest to the body type of the beginning worker is selected as the standard data to be compared.

The information processor 601 further generates an instruction image regarding correction of the work by the beginning worker according to the standing position and the angle of each joint, and displays the instruction image on the display device 600. For example, in the case where the standing position is slightly displaced to the right as compared with that of the skilled worker, an arrow changed in size, thickness, or color according to a displacement width of the standing position may be indicated toward a direction to correct the standing position, or a message such as "Please stand a little to the left." may be displayed. Besides, regarding the angle of each joint, such a configuration may be employed that an instruction image by an arrow or a message is similarly generated.

Note that the information processor 601 may be configured to monitor the standing position of the worker at all times and, after detecting completion of the (1) work, determine that the worker has shifted to the (2) work. Besides, such a configuration may be employed that, for example, in the case of performing simulation of the work, the worker wears a pin microphone in advance, voice such as "Start attachment!", "Attachment OK!" is produced every time of start and end of the work, the voice is sent to the information processor 601, and the information processor 601 determines that the worker is performing the (2) work on the basis of the voice.

Besides, in the case of work in which movement is generated at the time of shifting from the (1) work to the (2) work, such a configuration may be employed that flow lines of the skilled worker and the beginning worker may be compared. The flow line may be specified, for example, by arranging RFIDs in a lattice form on the floor and analyzing strengths of signals read by a reader attached to the worker.

Then, the flow line of the skilled worker as the standard data and the flow line of the beginning worker as the work data are compared, and an arrow changed in size, thickness, or color according to a displacement width in the flow line may be indicated toward a direction to correct the movement, or a message such as "Please move on a little to the right." may be displayed.

Note that the information processor 601 may be configured to monitor the flow line of the worker at all times and, when movement of a predetermined distance or more occurs, make a determination of the flow line. Besides, such a configuration may be employed that, for example, in the case of performing simulation of work, the worker wears a pin microphone in advance, voice such as "Start movement!", "Movement completed!" is produced every time of start and end of the work, the voice is sent to the information processor 601, and the information processor 601 determines that the worker is moving and there is a need to instruct regarding the flow line on the basis of the voice.

Though the configuration using the acceleration sensor or the RFID has been described in the above-described example, for example, such a configuration may be employed that a pressure sensor is attached to gloves, the rear of shoes or the like to measure pressure data, the motion of gripping or releasing an article, the number of steps or the like is analyzed based on the measured data, and an instruction regarding correction of the work is provided, and the work data on an object to be measured is not particularly limited.

A preferred embodiment of the present invention has been described in detail in the above, but the present invention is not limited to the specific embodiment.

According to the above-described embodiment, it is possible to speedily inform a worker of an instruction to correct work and appropriately inform a junior worker of a skill of a skilled worker.

Further, according to the processing in the above-described embodiment, it is possible to generate an instruction image regarding correction of the work by simple information processing in an information system and display the instruction image superimposed on the real space, thereby making it possible to reduce the amount of communication between the display device 600 and the information processor 601. This enables decrease in usage rate of a band of a network. Further, since the instruction image regarding correction of the work can be generated by simpler information processing in the information processor 601, the usage rate of the CPU 631 and the like of the information processor 601 can be decreased.

The invention claimed is:
1. An information processing system comprising:
 a storage device that stores standard data on a 3D model on work which is generated based on motion data regarding the work;
 a standard data acquirer that acquires the standard data from the storage device;

a work data acquirer that acquires work data on a 3D model on a worker which is generated based on motion data of the worker performing the work;

a determiner that determines whether or not a difference between the standard data acquired by the standard data acquirer and the work data acquired by the work data acquirer is a threshold value or more for each point, set according to work, for comparison between the standard data and the work data;

a generator that generates, when the difference is determined to be the threshold value or more at least one point for comparison by the determiner, an instruction image regarding correction of the work according to the difference regarding the point for comparison determined by the determiner that the difference is the threshold value or more;

a displayer that displays the instruction image generated by the generator on a display unit of a display device to display the instruction image superimposed on a real space;

an evaluator that evaluates whether or not the standard data stored in the storage device is appropriate according to a percentage of workers determined to have the difference of the threshold value or more by the determiner among a plurality of workers performing the work; and a re-register that re-registers a new standard data as the standard data to the storage device when the standard data stored in the storage device is evaluated to be not appropriate by the evaluator.

2. The information processing system according to claim 1, further comprising:
a register that registers the standard data.

3. An information processor comprising:
a storage device that stores standard data on a 3D model on work which is generated based on motion data regarding the work;

a standard data acquirer that acquires the standard data on work from the storage device;

a work data acquirer that acquires work data on a 3D model on a worker which is generated based on motion data of the worker performing the work;

a determiner that determines whether or not a difference between the standard data acquired by the standard data acquirer and the work data acquired by the work data acquirer is a threshold value or more for each point, set according to work, for comparison between the standard data and the work data;

a generator that generates, when the difference is determined to be the threshold value or more at least one point for comparison by the determiner, an instruction image regarding correction of the work according to the difference regarding the point for comparison determined by the determiner that the difference is the threshold value or more;

a transmitter that transmits the instruction image generated by the generator to a display device;

an evaluator that evaluates whether or not the standard data stored in the storage device is appropriate according to a percentage of workers determined to have the difference of the threshold value or more by the determiner among a plurality of workers performing the work; and a re-register that re-registers a new standard data as the standard data to the storage device when the standard data stored in the storage device is evaluated to be not appropriate by the evaluator.

4. An information processing method executed by an information processor, the information processing method comprising:

a storage step of storing standard data on a 3D model on work which is generated based on motion data regarding the work in a storage device;

a standard data acquisition step of acquiring the standard data from the storage device;

a work data acquisition step of acquiring work data on a 3D model on a worker which is generated based on motion data of the worker performing the work;

a determination step of determining whether or not a difference between the standard data acquired by the standard data acquisition step and the work data acquired by the work data acquisition step is a threshold value or more for each point, set according to work, for comparison between the standard data and the work data;

a generation step of generating, when the difference is determined to be the threshold value or more at least one point for comparison by the determination step, an instruction image regarding correction of the work according to the difference regarding the point for comparison determined by the determination step that the difference is the threshold value or more;

a display step of displaying the instruction image generated by the generation step on a display unit of a display device to display the instruction image superimposed on a real space;

an evaluation step of evaluating whether or not the standard data stored in the storage device is appropriate according to a percentage of workers determined to have the difference of the threshold value or more by the determination step among a plurality of workers performing the work; and a re-register step of re-registering a new standard data as the standard data to the storage device when the standard data stored in the storage device is evaluated to be not appropriate by the evaluation step.

5. An information processing method executed by an information processing system, the information processing method comprising:

a storage step of storing standard data on a 3D model on work which is generated based on motion data regarding the work in a storage device;

a standard data acquisition step of acquiring the standard data from the storage device;

a work data acquisition step of acquiring work data on a 3D model on a worker which is generated based on motion data of the worker performing the work;

a determination step of determining whether or not a difference between the standard data acquired by the standard data acquisition step and the work data acquired by the work data acquisition step is a threshold value or more for each point, set according to work, for comparison between the standard data and the work data;

a generation step of generating, when the difference is determined to be the threshold value or more at least one point for comparison by the determination step, an instruction image regarding correction of the work according to the difference regarding the point for comparison determined by the determination step that the difference is the threshold value or more;

a transmission step of transmitting the instruction image generated by the generation step to a display device;

an evaluation step of evaluating whether or not the standard data stored in the storage device is appropriate according to a percentage of workers determined to have the difference of the threshold value or more by the determination step among a plurality of workers performing the work; and a re-register step of re-registering a new standard data as the standard data to the storage device when the standard data stored in the storage device is evaluated to be not appropriate by the evaluation step.

6. A non-transitory computer-readable recording medium recording a program to cause a computer to execute:

a storage step of storing standard data on a 3D model on work which is generated based on motion data regarding the work in a storage device;

a standard data acquisition step of acquiring the standard data from the storage device;

a work data acquisition step of acquiring work data on a 3D model on a worker which is generated based on motion data of the worker performing the work;

a determination step of determining whether or not a difference between the standard data acquired by the standard data acquisition step and the work data acquired by the work data acquisition step is a threshold value or more for each point, set according to work, for comparison between the standard data and the work data;

a generation step of generating, when the difference is determined to be the threshold value or more at least one point for comparison by the determination step, an instruction image regarding correction of the work according to the difference regarding the point for comparison determined by the determination step that the difference is the threshold value or more;

a transmission step of transmitting the instruction image generated by the generation step to a display device;

an evaluation step of evaluating whether or not the standard data stored in the storage device is appropriate according to a percentage of workers determined to have the difference of the threshold value or more by the determination step among a plurality of workers performing the work; and a re-register step of re-registering a new standard data as the standard data to the storage device when the standard data stored in the storage device is evaluated to be not appropriate by the evaluation step.

7. The information processing system according to claim 1, further comprising a comparator that compares at least one of a standing position, a posture, or flow lines when the worker is performing the work.

8. The information processing system according to claim 1, further comprising a second determiner that determines that the worker is performing the work based on a voice of the worker.

* * * * *